UNITED STATES PATENT OFFICE.

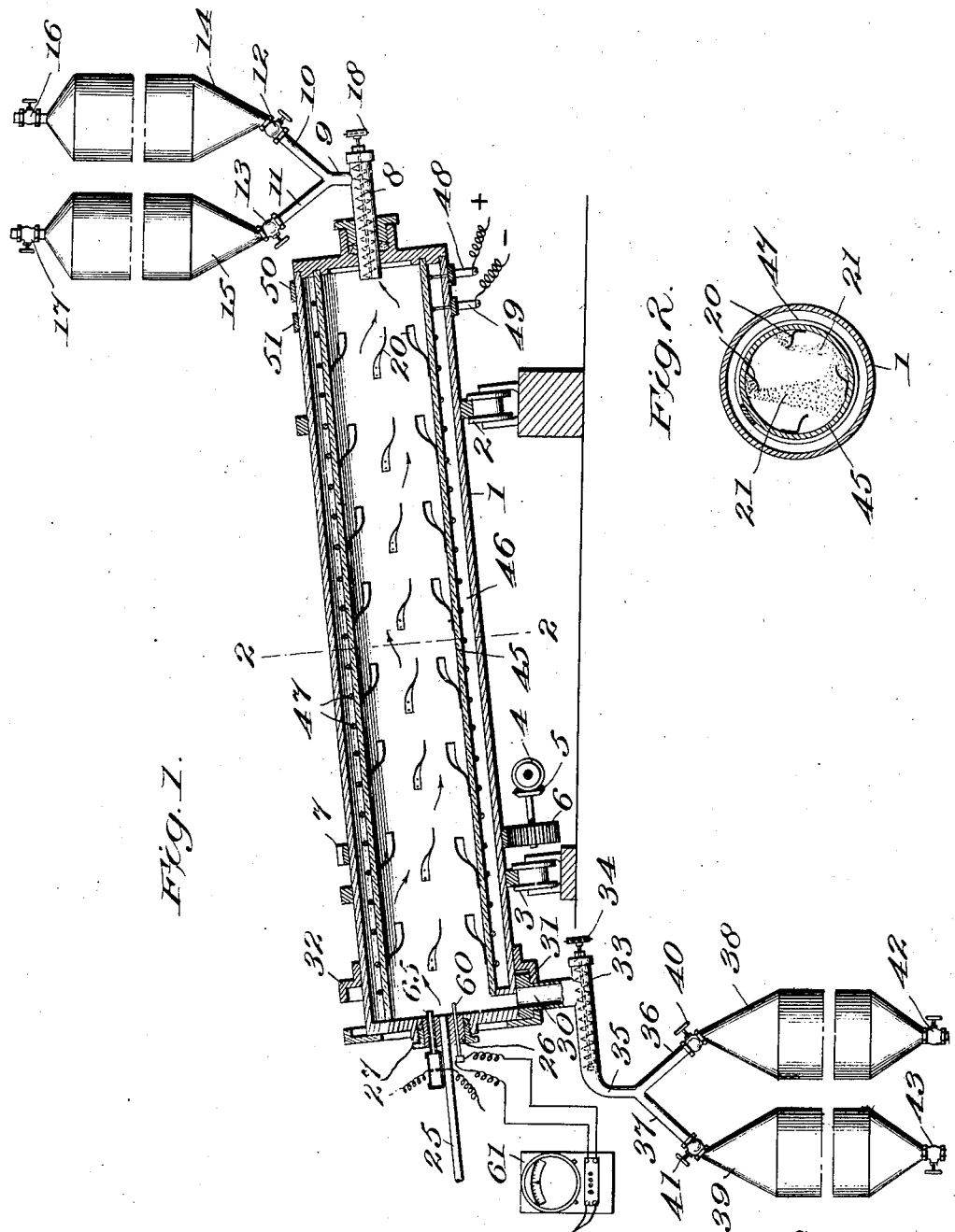

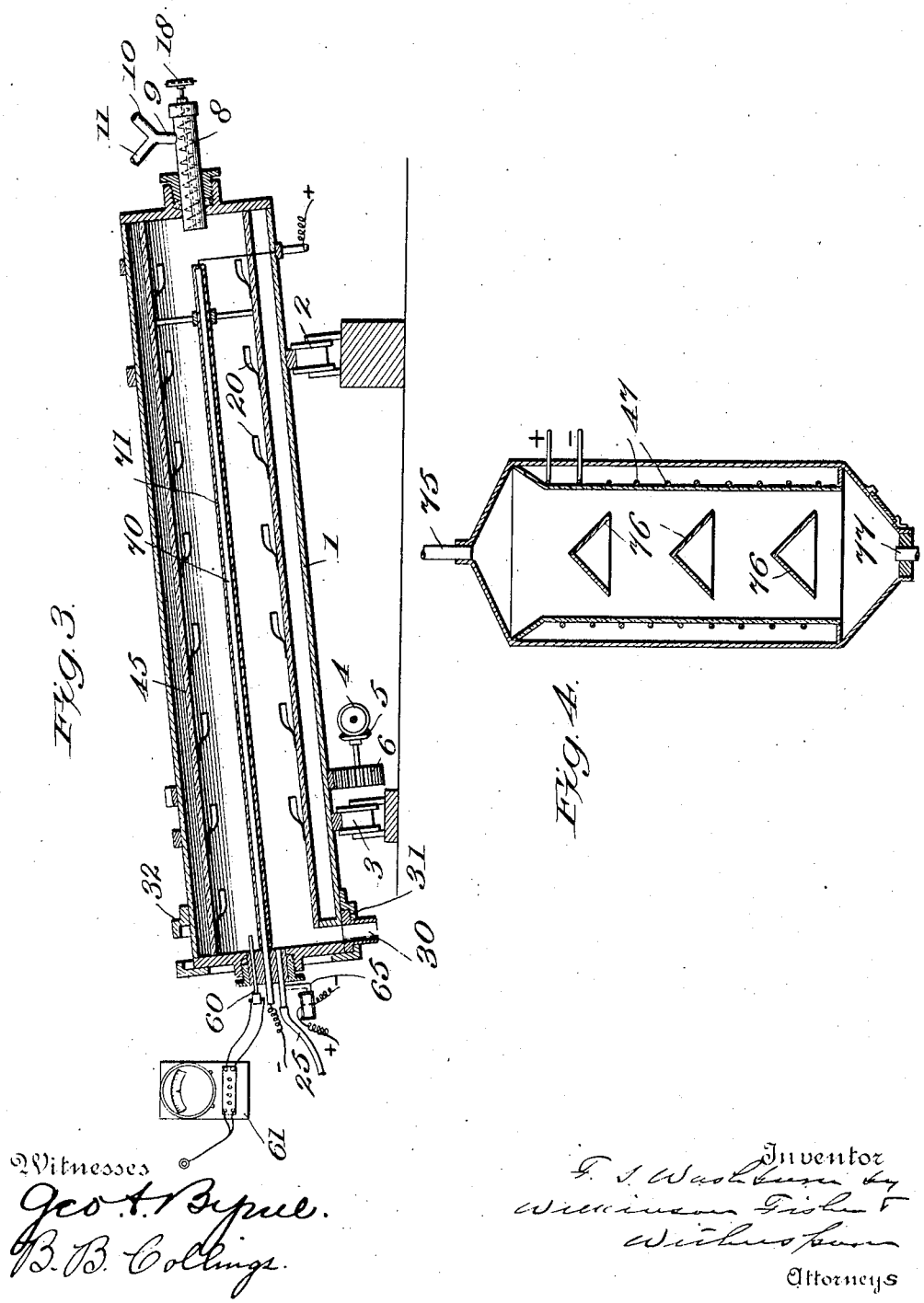

FRANK S. WASHBURN, OF NASHVILLE, TENNESSEE, ASSIGNOR TO AMERICAN CYANAMID COMPANY, OF BALTIMORE, MARYLAND, A CORPORATION OF MAINE.

METHOD OF MAKING CYANAMID 1,004,509.            Specification of Letters Patent.     Patented Sept. 26, 1911.

Application filed February 23, 1910. Serial No. 545,527.

*To all whom it may concern:*

Be it known that I, FRANK S. WASHBURN, a citizen of the United States, residing at Nashville, in the county of Davidson and State of Tennessee, have invented certain new and useful Improvements in Methods of Making Calcium Cyanamid; and I do hereby declare the following to be a full, clear, and exact description of the invention, such as will enable others skilled in the art to which it appertains to make and use the same.

This invention relates to a process of and an apparatus for treating calcium carbid to form calcium cyanamid and has for its object to shorten the process and to improve the apparatus now in use for this purpose.

With these and other objects in view the invention consists in the novel combinations of steps, details of construction and combinations of parts more fully hereinafter disclosed and particularly pointed out in the claims.

Referring to the accompanying drawings forming a part of this specification in which like numerals refer to like parts in all the views:—Figure 1, is a diagrammatic, sectional, elevational view of an apparatus suitable for carrying out my invention; Fig. 2, is a sectional view taken on the line 2—2 of Fig. 1; Fig. 3, is a sectional view of a modified portion of the apparatus shown in Fig. 1; and, Fig. 4, is a diagrammatic, elevational, sectional view of a still further modified form of the invention.

Calcium cyanamid has heretofore either been made directly from the molten carbid, or, in externally heated retorts, or, in internally heated oven, wherein has been placed pulverized carbid and brought into contact with nitrogen at a proper temperature.

The operations in the retorts and ovens have been conducted with charges of convenient weight, the operation being intermittent and involving a change of manipulations, periods of inactivity, an excessive amount of expensive apparatus, and delays and undesirable variations in temperature. The most serious disadvantage, however, in the present methods of manufacture is the length of time required to complete the reaction between the nitrogen gas and the powdered carbid necessary to the formation of calcium cyanamid. The present invention obviates all of these difficulties, and a suitable apparatus for practicing the same consists of a revolving kiln or retort 1, suitably mounted as upon rollers 2 and 3 with its longitudinal axis slightly inclined, and driven conveniently from a source of power 4, through the gears 5 and 6, the latter intermeshing with the circular rack 7, as illustrated.

Into the upper end of the retort 1, the powdered carbid is fed as by the screw conveyer 8 communicating with the passage 9 connected with the branch pipes 10 and 11 controlled by the valves 12 and 13 and leading to the reservoirs 14 and 15 provided with the top valves 16 and 17. The conveyer 8 may be operated by any suitable source of power, as 18, and the carbid is delivered into the retort in a fine stream where it settles on the bottom of the same and is immediately caught up by roughnesses or depressions on the inside of the retort or by the vanes or fingers 20 as they revolve, and thereupon continuously dropped to the bottom again in streams 21, as best illustrated in Fig. 2.

The retort being inclined, the carbid 21 will find its way to the lower end of the same in a period of time depending upon the inclination of the retort and the speed at which it is driven, after having been raised and dropped a number of times depending upon the number of blades 20. In other words, it is evident that the carbid can be made to stay in the retort as long or as short a time as may be desired, and that it may be stirred by the blades 20 as much as may be found necessary.

Nitrogen gas is preferably admitted through the pipe 25 entering the stationary plug 26 surrounded by the stuffing box 27, and since the powdered carbid is thoroughly stirred, as above described, the said nitrogen is brought into the most intimate contact with every particle of the carbid. The nitrogen is prevented from escaping from the apparatus at the upper end by means of the valves 16 and 17. When carbid is being fed from one of the containers, as 14, its valve 12 may be opened while its valve 16 is closed. In the meantime the valve 13 of the containers 15 may be closed and the valve 17 opened, whereupon the container 15 may be filled without stopping the apparatus. Of course, after the container 14 is exhausted its valve 12 may be closed and its valve 16 opened for the purpose of refilling and carbid may be fed from the container 15 by opening the valve 13 and closing the valve 17. In the same way the cyanamid when formed may be delivered from the apparatus without the loss of the nitrogen through the passage 30 making a tight joint as at 31 with the annular bearing 32 and communication with the conveyer 33 driven from the source of power 34 and communicating with the pipes 36 and 37 entering respectively the delivery reservoirs 38 and 39 and controlled, respectively, by the valves 40 and 41. The delivery reservoirs 38 and 39 are respectively provided at their lower ends with valves 42 and 43. It is evident that the valves 40, 41, 42 and 43 may be manipulated in the manner above described to enable the operator to receive cyanamid into one reservoir while emptying from the other, and vice versa and that the nitrogen may be prevented from escaping during the operation.

The inner cylinder 45 is preferably made of suitable fire resisting material such for example as porcelain or fire clay, and it is separated from the outer cylinder 1 by a space 46 which will soon become filled with nitrogen. The cylinder 45 may be heated in any suitable manner to start the reaction between the nitrogen and the carbid and I have shown an electric resistance 47 through which current is passed from the leads 48 and 49 contacting respectively with the rings 50 and 51 encircling the outer cylinder 1. But, it is evident, that any other suitable means of heating may be substituted for the resistance shown.

As is well known, in order to start the reaction between the nitrogen and the carbid it is necessary to raise it to an initial temperature of about 1200° C. when the reaction starts. The reaction between the nitrogen and the powdered carbid is so highly exothermic that it will maintain the necessary temperature for a continuous reaction, either without the continued use of the independent heating appliance or with some aid therefrom. The powdered carbid and the nitrogen at the proper temperature produce cyanamid which together with certain waste products, chiefly free carbid and lime, may be delivered from the lower end of the retort, as above stated. It is also well known that an efficient process for producing cyanamid must keep the temperature in the retort between certain limits, and that since the reaction going on in the old style retorts was variable the temperature therein likewise varied. In order to render my process automatic in this respect, I provide a suitable thermostatic device, diagrammatically shown as at 60, which enters the retort, closes a circuit when the temperature gets too high and thereby through a suitable device 61 operates a relay to cut off the source of current in a manner well known. It is also well known that if the pressure in the retort gets too high or too low very serious disturbances take place and the efficient production of cyanamid is interfered with. In order to automatically do away with these disadvantages I likewise provide any suitable pressure device diagrammatically shown as at 65 which communicates with the interior of the retort, and when the pressure gets too high or too low suitable circuits are opened or closed and the pump or other device which delivers nitrogen is correspondingly controlled. The thermostatic devices which I have found suitable for my purposes being well known in the art, and their specific constructions forming no part of my invention they are not further illustrated herein.

In Fig. 3 the parts are the same as in Fig. 1 except a resistance rod 70 preferably provided with a porcelain or other refractory cover 71 is employed instead of the resistance conductor 47.

In the diagrammatic view of a further modification shown in Fig. 4 the retort is stationary, the carbid enters at 75 falls past a series of baffle plates 76 in relatively fine streams, the nitrogen enters at 77, and the retort may be heated by the resistance 47 or by any other suitable means.

It will be obvious in all the forms that my process by causing the nitrogen to be thoroughly mixed with every particle of the carbid insures a rapid and speedy conversion of the carbid into cyanamid, and thereby very greatly reduces the time now necessary to accomplish this conversion and at the same time greatly increases the output of the factory. In addition to this, since the passage of the carbid through the retort is absolutely under the control of the operator and since the temperature in the retort as well as the pressure of the nitrogen can either be observed at all times or can be automatically regulated, it will be seen that the cyanamid product is exceedingly uniform.

It is obvious that those skilled in the art may vary the details of construction and the arrangement of parts without departing from the spirit of this invention, and, therefore, I do not wish to be limited to such features, except as may be required by the claims.

What I claim is:—

1. The process of making calcium cyanamid from calcium carbid which consists in causing the finely divided carbid to be repeatedly raised and dropped while moving through an atmosphere of nitrogen; and in maintaining said nitrogen and carbid at the requisite temperature to produce the cyanamid, substantially as described.

2. The process of making calcium cyanamid from calcium carbid which consists in causing the finely divided carbid to rise and fall while moving through and becoming intimately mixed with an atmosphere of nitrogen; in raising said carbid and nitrogen to the temperature necessary to start the reaction; and in maintaining a temperature thereafter suitable for keeping up the reaction, substantially as described.

3. The process of making calcium cyanamid from calcium carbid, which consists in causing the finely divided carbid to progressively move through and become intimately mixed with an atmosphere of nitrogen; in raising said carbid and nitrogen to the temperature necessary to start the reaction; and in automatically maintaining a temperature and pressure in said atmosphere thereafter suitable for keeping up the reaction, substantially as described.

4. The process of making calcium cyanamid from finely divided calcium carbid which consists in causing said carbid to rise and fall while moving through an atmosphere of nitrogen; in maintaining the same at the requisite temperature to produce cyanamid; and in so regulating the speed at which said carbid moves as to cause substantially all of it to react with the nitrogen, substantially as described.

5. The process of making calcium cyanamid from calcium carbid, which consists in repeatedly subjecting in the presence of nitrogen small quantities of said carbid to the action of a heated surface; and in raising said surface to a temperature sufficient to form said calcium cyanamid, substantially as described.

In testimony whereof, I affix my signature, in presence of two witnesses.

FRANK S. WASHBURN.

Witnesses:
 STANLEY HANNA,
 CHAS. BRIGGMAN.